United States Patent [19]
Porter

[11] Patent Number: 6,032,970
[45] Date of Patent: Mar. 7, 2000

[54] UPPER BODY ACTIVATED CYCLE

[76] Inventor: Todd A. Porter, 1225 Del Mar Dr., Los Osos, Calif. 93402

[21] Appl. No.: 09/302,546

[22] Filed: Apr. 30, 1999

Related U.S. Application Data

[63] Continuation-in-part of application No. 08/692,911, Jul. 25, 1996, abandoned, which is a continuation-in-part of application No. 08/340,160, Nov. 15, 1994, abandoned.

[51] Int. Cl.[7] ..................................................... B62M 3/00
[52] U.S. Cl. ........................... 280/234; 280/247; 280/256
[58] Field of Search .................................. 280/230, 233, 280/234, 242, 244, 247, 253, 256

[56] References Cited

U.S. PATENT DOCUMENTS

| | | | |
|---|---|---|---|
| 4,712,789 | 12/1987 | Brilando | 272/73 |
| 4,712,790 | 12/1987 | Szymski | 272/73 |
| 4,733,880 | 3/1988 | Wilhelm, III | 280/234 |
| 5,280,936 | 1/1994 | Schmidlin | 280/234 |

FOREIGN PATENT DOCUMENTS

| | | | |
|---|---|---|---|
| 7427 | of 1889 | United Kingdom | 280/234 |
| 3944 | of 1895 | United Kingdom | 280/234 |
| 22971 | of 1902 | United Kingdom | 280/233 |
| 295590 | 2/1929 | United Kingdom | 280/233 |

*Primary Examiner*—J. J. Swann
*Assistant Examiner*—Michael Cuff

[57] ABSTRACT

An upright in-line cycle having a frame, front steerable wheel, drivable rear wheel, drive sprocket, driven sprocket, oscillatory steering levers, a fork assembly, a drive crank assembly, and drive with connecting rods operably connected such that the oscillatory levers are pivotally mounted on the fork journaled to connecting rods such that the oscillatory levers are substantially perpendicular to the connecting rods and the connecting rods are substantially parallel to the plane of the ground. The oscillatory levers and connecting rods are operably connected so that the alternate pushing or pulling on the oscillatory levers drives the cycle forward, convening upper body energy into rotational energy. The manner in which the oscillatory levers are journaled to the forward end of the connecting rods, by tie rod ends or two-way joints, permits the levers to pivot in a lateral left or right direction thereby permitting steering of the front wheel. The front and rearward ends of the connecting rods are provided may be removed either through an open ended shape or with a quick release to allow the connecting rods to be disconnected and removed. The oscillatory levers can then be clasped together with a ridged member so that levers no longer oscillate and the bike may be ridden as a lower body powered cycle, as in a conventional cycle.

6 Claims, 7 Drawing Sheets

UPPER BODY ACTIVATED CYCLE

This is a continuation-in-part of application Ser. No. 08/692, 911, filed Jul. 25, 1996, (abandoned). Application Ser. No. 08/692,911 is a continuation-in-part of application Ser. No. 08/340,160, filed Nov. 15, 1994 (abandoned).

BACKGROUND OF THE INVENTION

1. Field of the Invention

The invention relates to an bicycle and more particularly to cycles at least partially powered by the upper body by manual movement.

2. Description of the Prior Art

Manually powered bicycles, in contrast to the conventional pedal powered bicycles, are well known and have been in existence for many years. All cycles that have attempted to combine arm and leg power are either stationary, recumbent in design or encumbered by heavy, inefficient mechanisms. Examples of such cycles include those having separate front and rear drive mechanisms or those hindered by a poor match between the operator and machine through the use of less than optimum leverage and stroke. Many of the latter cycles limit the rider's ability to power the cycle while simultaneously steering the vehicle.

Most importantly, none of the prior art describes a manually powered bicycle where there is a structural limitation comprised of a ridged strip restricting the independent motion of the oscillating levers permitting the bicycle to be operated either as a lower body powered bicycle (a conventional cycle) or an upper and lower body powered bicycle.

U.S. Pat. No. 5,282,640, issued Feb. 1, 1994, discloses and claims an exercise bicycle which uses an additional crank, sprocket and clutch mechanism to create what is essentially a front wheel drive, separate and apart from the rear wheel drive propelled by the foot pedals. This bicycle places the rider in an awkward position and provides for upper body exertion which is not efficient or compatible with lower body exertion. In addition, this bicycle has numerous additional mechanical components which are cumbersome which impede commercial success. Most importantly, this prior art fails to describe a manually powered bicycle where there is a structural limitation comprised of a ridged strip restricting the independent motion of the oscillating levers permitting the bicycle to be operated either as a lower body powered bicycle (a conventional cycle) or an upper and lower body powered bicycle.

U.S. Pat. No. 5,280,936, issued Jan. 25, 1994; U.S. Pat. No. 4,976,451, issued Dec. 11, 1990; and U.S. Pat. No. 4,639,007, issued Jan. 27, 1987, are all directed to recumbent vehicles. In the '936 patent, a clutch mechanism and an additional chain is used to simulate a rowing motion to propel the vehicle. In the '451 patent, an extra chain and a movable seat are utilized to simulate a rowing motion to propel the vehicle. The '007 patent discloses a four wheeled, rowing motion vehicle.

U.S. Pat. No. 5,272,928, issued Dec. 28, 1993, discloses and claims a deviant from mainstream bicycles which encompasses the production of power via a rotatable member.

U.S. Pat. No. 5,002,298, issued Mar. 26, 1991, is directed to a bicycle in which a hand crank located at approximately the center of the bicycle frame assists the standard foot crank. The concept of this bicycle is to develop upper body exercise. However, the concept is intrinsically flawed because the rider is put in a position which is not ergonomic and which does not allow upper and lower body strength to be utilized together in a complementary manner. The rider is placed in an inherently upright position which does not allow the arm to extend in a motion which is short and powerful. Furthermore, the operation of the hand crank requires the user to release a hand from of the steering mechanism which leads to the unsafe operation of the bicycle.

U.S. Pat. No. 4,925,200, issued May 15, 1990, is directed to a tricycle using a second chain and a lever mechanism to allow the upper body to assist in the propulsion of the vehicle. The rider is placed in the recumbent position.

U.S. Pat. No. 4,773,662, issued Sep. 27, 1988, discloses and claims an upright in-line bicycle which utilizes an extra crank, sprocket, chain and gears in which the front wheel drive is independent of the rear wheel drive propelled by the riders lower body. The invention is deficient in that the upper and lower body exertions do not compliment one another and the added components are cumbersome and unattractive.

U.S. Pat. No. 4,757,988, issued Jul. 19, 1988; U.S. Pat. No. 4,712,790, issued Dec. 15, 1987; and U.S. Pat. No. 4,712,790, issued Dec. 15, 1987re all directed stationary cycle type exercisers that are not designed for transportation. There is no suggestion in any of these reference of using handlebar levers for propulsion of cycles designed for transportation.

U.S. Pat. No. 4,733,880, issued Mar. 29, 1988, discloses and claims an upright in-line bicycle using hand levers and connecting rods to allow upper body strength to assist a rear drive bicycle. The riders mobility on this cumbersome and inefficient bicycle is severely limited by the design. The overall design of the bicycle is such a radical departure from a conventional bicycle to have any significant commercial appeal.

Patent DE 3629-85 I-A, Document Number 3,629,851, is a foreign patent disclosed by Lehmann issued Mar. of 1988, which claims an upright in-line bicycle using levers which move up and down to pull on cords looped over a series of rollers to assist a rear-drive bicycle. The invention is deficient for a number of reasons. The upper and lower body exertions do not compliment one another as the levers move up and down in a vertical direction such that the motion is substantially perpendicular to the plane of the ground, which poorly matches the upper and lower body stroke such that the rider would necessarily be placed in an inherently uncomfortable position which would not allow the arm to extend all power in the cycle. The invention has added components which are cumbersome and unattractive, including the use of rollers and cords and an unusual rectangular bracket fixed to the levers and fork to house the roller and cord system. The overall design of the bicycle is such a radical departure from a conventional bicycle to have any significant commercial appeal. These additional mechanical components are cumbersome which impede commercial success.

Patent DE 3132019 A1 disclosed by Sterling Document Number 3,132,019, issued in March of 1983 discloses and claims an upright in-line bicycle which utilizes clutches, an additional upper chain wheel, and a second chain drive to permit the upper body to assist rear wheel drive. The invention is deficient for a number of reasons. The bicycle places the rider in an awkward position, provides for upper body exertion which is not efficient or compatible with lower body exertion. The upper body stroke requires the arm to move in an up and down direction substantially perpendicular to the plane of the ground which fails to compliment the upper and lower body stroke. The uncomfortable and inefficient position is illustrated by the need for a support for the chest, which is mounted over the crossbar of the bicycle frame. The rider's mobility on this cumbersome and inefficient bicycle is severely limited by the design. The overall design of the bicycle is a radical departure from a conventional bicycle. The additional mechanical components are cumbersome and unattractive, which impedes commercial success.

Patent No. 22-971, Document Number 22,971, is a German Patent issued October of 1902, disclosed by Von Gienanth, and claims an upright in-line bicycle using hand levers and connecting rods to allow upper body strength to assist a rear drive bicycle. The overall design of the bicycle is deficient in the following respects. The connecting rods lack any resilient means such that when the front wheel of the bicycle is steered left or right, the connecting rods cannot compensate for the fact that the fork moves closer to and away from the crank, making it impossible to effectively steer the bicycle. In addition, the geometry of the connecting rods impede the efficient transfer of upper body energy to rotational energy. The connecting rods are mounted at the fork where the fork joins to the frame. The connecting rods are not substantially parallel to the ground. The angle in which the connecting rod provides thrust to the crank provides substantially less than 180° of assisting rotational energy of transference such that the upper body energy is not efficiently transferred to the crank, providing for a less efficient mechanism from converting upper body exertion to rotational energy.

Patent No. 295-590, Document Number 295,590, is a foreign patent issued in February of 1929. Ferri discloses and claims an upright in-line bicycle utilizing a series of connecting rods to allow upper body strength to assist a rear drive bicycle. The riders mobility on this cumbersome and inefficient bicycle is severely limited by the design. The upper body stroke is poorly matched to lower body stroke in that the upper body exertion is an up and down motion substantially perpendicular to the plane of the ground. This places the rider in an awkward position and provides for upper body exertion which is inefficient with lower body exertion. In addition, the design of the bicycle has unattractive mechanical components which are cumbersome and unattractive and which impede commercial success. The overall design of the bicycle is a radical departure from a conventional bicycle with any significant commercial appeal.

Patent No. 3944, Document Number 3944, is a foreign patent issued February of 1895. Valere discloses and claims an upright in-line bicycle utilizing connecting rods to allow upper body strength to assist a rear drive bicycle, The invention is deficient for the following reasons. The upper body exertion forces the rider to push up and down on the levers such that the motion is substantial perpendicular to the plane of the ground. This poorly matches upper body and lower body stroke. It places the rider in an extremely awkward position where the rider will bob up and down as the arms go up and down to exert pressure on the levers. Additionally, the connecting rods lack any resilient means so as to fail to structurally provide for the necessity of the connecting rod becoming slightly elongated or shortened during steering of the cycle. Also, the geometry of the mechanical relationship of the levers, connecting rods and crank are deficient. The levers attach to the connecting rods at a point which is substantially elevated on the frame of the cycle above the fork. The connecting rods are not substantially parallel to the plane of the ground providing for poor stroke and inefficient energy transfer from upper to lower body. Also, the length of the lever when compared to the length of the connecting rod is so short that leverage from the lever to the connecting rod is compromised. Overall, this cycle poorly matches upper body and lower body stroke and fails to efficiently transfer upper body exertion into rotational energy.

Patent No. 7427A, Document Number 7,427, is a foreign patent issued May of 1889, and relates to a combined treadle and hand driving mechanism. The scope of the disclosure is not limited to bicycles. The disclosure requires an operator to work a double hand lever which utilizes a spring to bring it into an operative position. This requires the operator to utilize an up and down motion in order to assist the driving shaft and connecting mechanism. This disclosure involves a variety of cumbersome and inefficient components which are not within the scope of the claims of this disclosure.

Most importantly, none of the prior art describes a manually powered bicycle where there is a structural limitation comprised of a ridged strip restricting the independent motion of the oscillating levers permitting the bicycle to be operated either as a lower body powered bicycle (a conventional cycle) or an upper and lower body powered bicycle.

3. Advantages of the Present Invention

The present invention has the following advantages over the foregoing prior art cycles:

(a) To create a practical upright in-line upper body assisted cycle which has an aesthetically pleasing design.

(b) To create a truly ergonomic upper body assisted cycle in which the upper body motion complements the lower body motion to create a synergism and a more powerful and faster bicycle.

(c) To provide an upper body assisted cycle in which the upper body exertion of the rider places the body in a position to fully utilize leg and hip strength.

(d) To achieve the above advantages (a) through (c) with a combination of means which are simple, direct, sturdy, dependable, energy conserving and reliable.

(e) To provide an upper body assisted cycle with a minimum number of means which are easy to attach to an existing cycle, and which are easy to adjust and maintain.

(f) To provide an upper body assisted cycle which uses non-complex and non-cumbersome means integrated into an aesthetically pleasing combination.

(g) To provide a human powered cycle that exercises every major muscle group to a high degree of efficiency, through proper matching of motion which feels ergonomically correct.

(h) To provide a bicycle which is comfortable to mount, to handle and to ride and allows a panoramic view.

(i) To provide a safely operated upper body assisted bicycle in which the rider does not have to release either hand from the upper body drive in order to maneuver the vehicle.

(j) To provide a novel upper body assisted bicycle in which a conventional bicycle can be modified by a small number of critical components.

(k) To provide a drive mechanism for a bicycle which yields optimum matching of the arms, legs and hips to a high mechanical advantage, and an ergonomically correct motion.

(l) To provide a simple drive mechanism for a bicycle which efficiently extracts power from virtually every major muscle group of the body.

(m) To provide for the ability to disconnect the connecting rods and join together the oscillatory levers so as to allow the bike to be easily converted to a lower body powered bike.

(n) Most importantly, to provide a manually powered bicycle where there is a structural limitation comprised of a ridged strip restricting the independent motion of the oscillating levers permitting the bicycle to be operated either as a lower body powered bicycle (a conventional cycle) or an upper and lower body powered bicycle.

SUMMARY OF THE INVENTION

The present invention describes an upper body activated cycle comprising: a frame, a front steerable wheel journaled on the frame, at least one drivable rear wheel journaled on the frame, a pair of oscillatory means for driving and steering the cycle operably mounted on the fork, a drive crank assembly rotably journaled to the lower portion of the fork, at least one drive sprocket journaled between the ends of the drive crank assembly, at least one driven sprocket attached to the drivable rear wheel, an endless chain operably connecting the sprockets, and a pair of drive connecting rods. Each of the oscillatory means is pivotally mounted on the fork and has an upper end which is formed into the shape of a handlebar and a lower end which is journaled to the forward end of a connecting rod such that the lever is mounted substantially perpendicular to the connecting rod whereby the rearward end of the connecting rod is journaled to the crank and the connecting rod is substantially parallel to the plane of the ground. The lower end of the lever is journaled to the forward end of the connecting rod so as to allow the levers to pivot in an lateral manner in a plane substantially parallel to the plane of ground. The connecting rods have means to disconnect from the respective oscillatory levers and crank, allowing the rider to remove the connecting rods altogether. The rider may then join the respective oscillatory levers together to the fork or other attachment on the frame with a rigid strip above the tire of the cycle so that the levers no longer oscillate. The cycle may now be powered by the legs only while the levers remain stationary and rigid. Thus, in a couple of simple steps the bike reverts from an upper and lower body powered cycle to a lower body powered cycle.

The term cycle is used to include two-wheeled and three-wheeled vehicle which can be powered forward by at least one person by alternately pushing and/or pulling the right and left hands respectively on the oscillatory means. Since the latter means also serve as the handlebars to steer the cycle, they have also been designated as oscillatory steering levers which are directly linked to the drive crank assembly.

Further objects, features and advantages of the cycle of the present invention will become apparent from a consideration of the drawings and the following description.

BRIEF DESCRIPTION OF THE DRAWRNGS

DETAILED DESCRIPTION OF THE INVENTION AND ENABLING DISCLOSURE

Referring to FIGS. 1–5, the preferred embodiment of the present invention, bicycle 10, contains most of the components of a conventional bicycle, i.e. seat 11 mounted to any standard flame 12 having right and left sides with fork tube 13. Fork assembly 14 is journaled in the usual manner on fork tube 13 of frame 12. Similarly, steerable front wheel 15 journaled in hub 16 of the lower end of fork assembly 14 and drivable wheel 20 is journaled in rear 22 of frame 12 in the same manner of a conventional bicycle. In such a bicycle, drive sprocket 23 is operably attached to drive crank assembly 24 comprising main drive shaft 25, main crank arms 26 and right and left foot pedals 28 and 29, front derailleur 30 is operably connected to drive sprocket 23, a plurality of driven sprockets 32 are attached to drivable rear wheel 20 and rear derailleur 33 is operably connected to driven sprocket 32. Front derailleur 30 and rear derailleurs 33 operate in a conventional manner to change gears. Standard brakes (not shown) and gear shifters 34 are mounted to flame 11 with the typical connecting wires (not shown). Endless chain 35 connects sprockets 23 and 32 in the standard manner.

The remaining unique components of bicycle 10 that are combined with the standard components of a conventional bicycle are more clearly shown in FIGS. 5–8. Handlebars (not shown) of a conventional bicycle are removed and replaced by right oscillating steering lever 40 and left oscillating steering lever 42. A fork in a conventional bicycle is replaced by unique fork assembly 14 having right nipple 44 and left nipple 45. Right and left levers 40 and 42 are respectively pivotally mounted to right and left nipples 44 and 45 on the fork assembly 14 by means of cotter pins 46 or other suitable fasteners. Standard roller bearings 48 or other suitable means to reduce friction at point of connection between right and left levers 40 and 42. Right and left drive connecting rods 50 and 52 are the unique linkages between right and left steering levers 40 and 42 and connecting arms 53 of drive shaft 25. Right and left tie rods 55 and 56 or two-way joints 92 and 94 or other similar means are operably connected between right and left connection rods 50 and 52 and ends 58 of right and left levers 40 and 42. Balls 62 and 64 are housed within tie rods 55 and 56 to permit the front wheel to be turned within a predetermined range.

Grease or other suitable composition is used to maintain lubrication of balls 62 and 64 and is added through nipples (not shown) in and flush with the bottom of tie rods 55 and 56. In the case of two-way joints, roller bearings or other similar means are used to reduce friction at the point of contact. Connecting rods 50 and 52 comprise front sections 70 which are bent in the manner illustrated and attached to tie rods 55 and 56, right and left tension springs 74 and 76, middle sections 78 which also contain similar bends, a two-way joint 82 mounted in between the resilient means and the rearward end of the connecting rod where the connecting rod is journaled to the crank and straight sections 86 which are connected to drive crank assembly 24 as described in detail below. Two-way joints 82 which move laterally in a predetermined range of motion to assist smooth operation of the connecting rods allows connecting rods 50 and 52 to pivot within a short predetermined range about pins 87 and to permit limited lateral movement during the driving and steering of the cycle.

Figure 6:
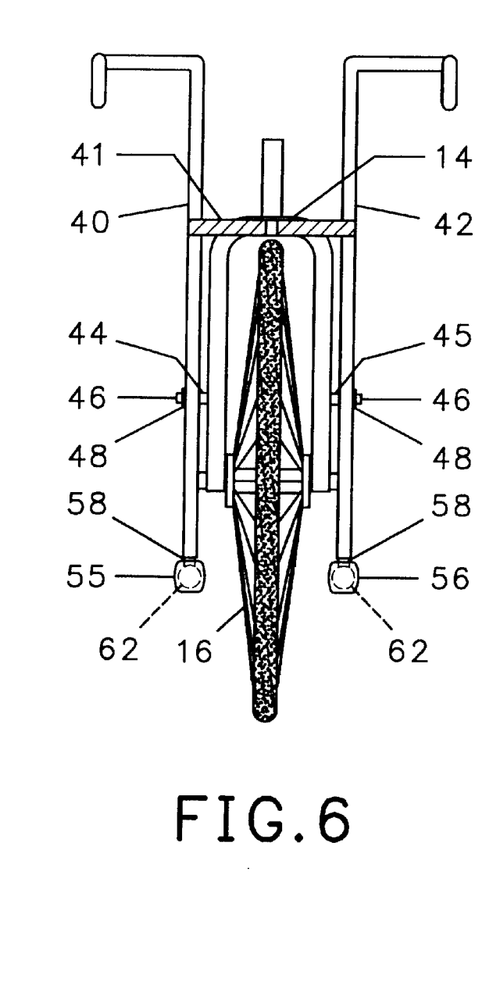
FIG. 6 is a front view of a preferred embodiment of the present invention without the frame, showing the levers disconnected from the connecting rod to convert the cycle to a conventional lower body only powered drive system. Also shown is a strip of rigid material pivotally mounted on one oscillatory levers clasped to the other lever and the fork, so that the levers no longer move, permitting the bicycle to be operated by the lower body only as in a conventional cycle.

Connecting rods 50 and 52 are provided with the means to disconnect rods from lever 40 and 50 and from crank 26 by utilizing a quick release which is common and well known in the industry or other means to disconnect and remove the connecting rods (such as the shape of the rod). The rods may be removed and lever 40 and 50 may be joined by a strip of metal 41 or other material as shown in FIG. 6. Whereby the levers become rigid and no longer oscillate but are stationary, allowing the rider to operate the cycle with the lower body as in a conventional cycle.

Figure 1:
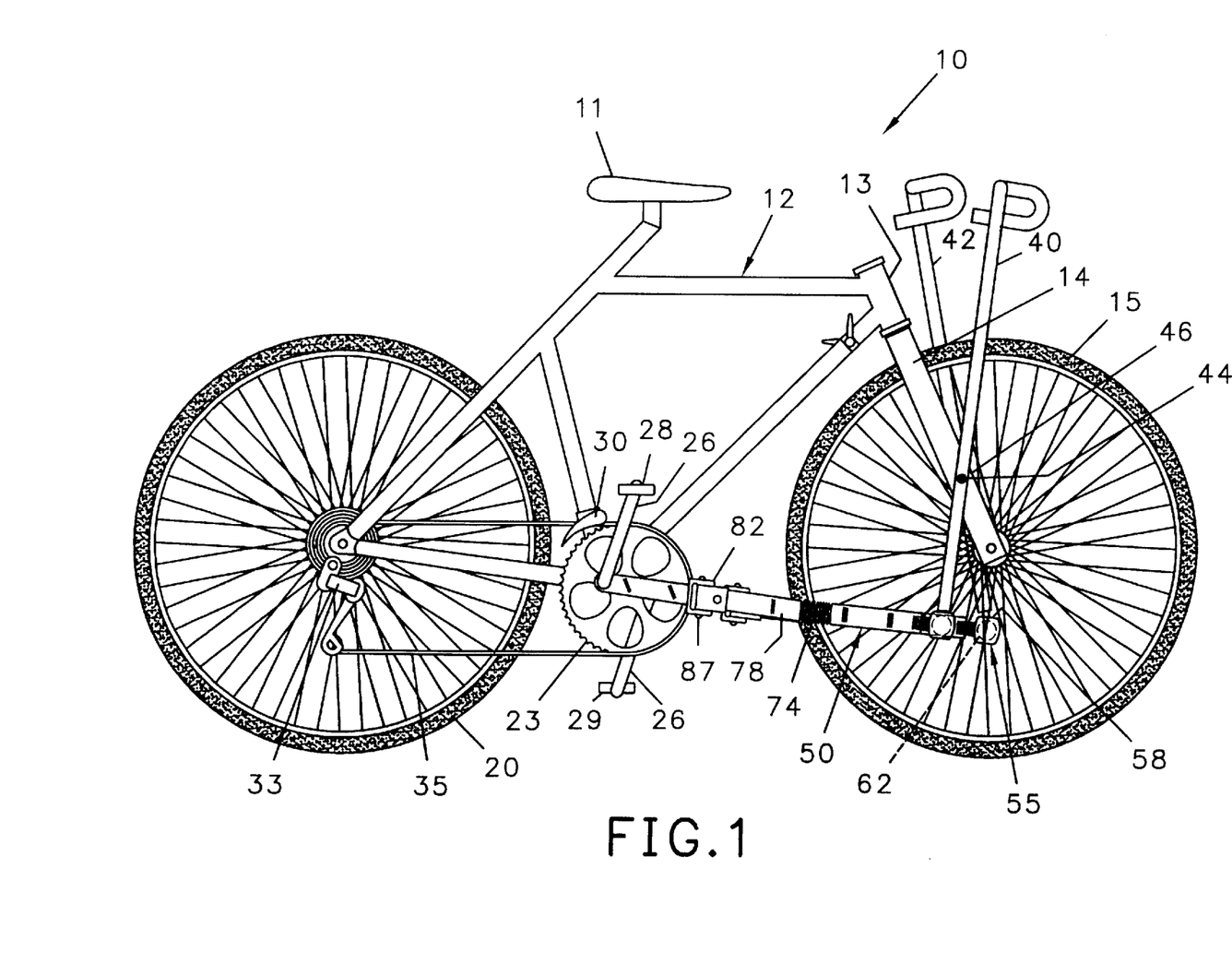
FIG. 1 is a right side view of a preferred embodiment of the present invention showing tie rod ends as steering means, together with tension springs for resilient means and a two-way joint pivotally mounted in between the resilient means and the rearward end of the connecting rod.
Figure 2:
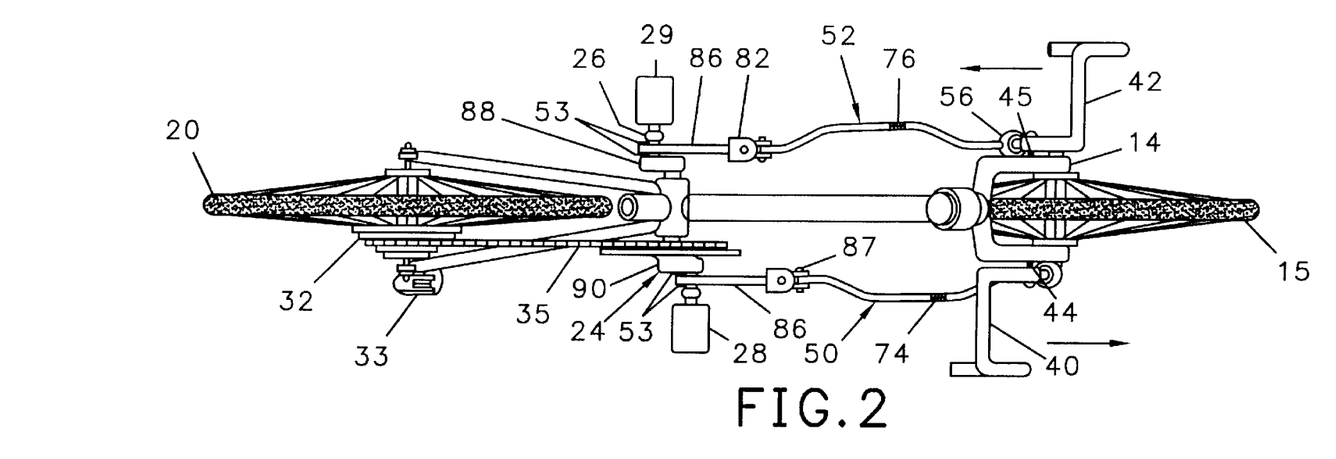
FIGS. 2 and 3 are top views, partially in cross-section, of the embodiment shown in FIG. 1 showing the oscillatory steering levers and the foot pedals.

A conventional drive crank assembly comprising a main drive shaft, crank arms and a pair of pedals is replaced by drive crank assembly 24. Drive crank assembly 24 encompasses main drive shaft 25. As shown in FIG. 2, one end of left crank arm 88 is connected to the left end of main drive shaft 25 to offset the foot pedals from a conventional bicycle. One end of right crank arm 90, which forms an integral part of driven sprocket 23 (FIG. 1), is connected to one end of main drive shaft 25. A pair of connecting arms 53 that are parallel to main drive shaft 25 are fixedly attached between the other ends of crank arms 88 and 90 and main crank arms 26. Straight sections 86 of drive connecting rods 50, 52 are concentrically mounted on connecting arms 53 and journaled for rotation by beatings (not shown) within connecting arms 53 or other suitable means to limit friction at the point of attachment of straight sections 86 to connecting arms 53.

Springs 74 and 76 permit predetermined and substantially limited shortening and lengthening of connecting rods 50 and 52 while bicycle 10 is being turned where the springs being of sufficient predetermined tension so as to stay substantially uncompressed during a normal push stroke during operation of the cycle. Two-way joints mounted in between the springs 74 and 76 and crank 82 and 84 allows connecting rods 50 and 52 to pivot laterally in a predetermined and substantially limited way about pins 87 to move parallel to the plane of the ground.

Figure 3:
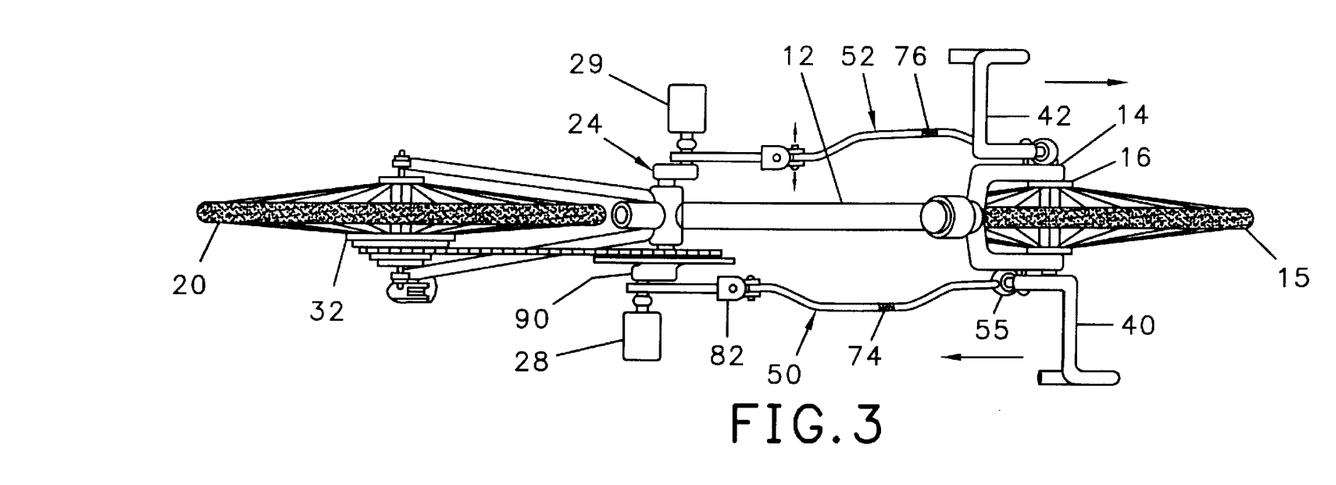

FIG. 2 depicts the relative position of right oscillating steering lever 40 and left oscillating steering lever 42 and right and left connecting rods 50 and 52 while left lever 42 has been pushed to its maximum forward position and right foot pedal 28 has been pushed to its maximum downward position to thrust bicycle 10 forward in synchronous movement by the rider during propulsion. Similarly, FIG. 3 depicts the relative position of right oscillating steering lever 40 and left oscillating steering lever 42 and connecting rods 50 and 52 while right lever 40 and left foot pedal 29 are at their maximum extension. In FIGS. 2 and 3, springs 74 and 76 are shown in their normal, non-compressed state and two-way joints 82 are shown in their normal position.

Figure 4:
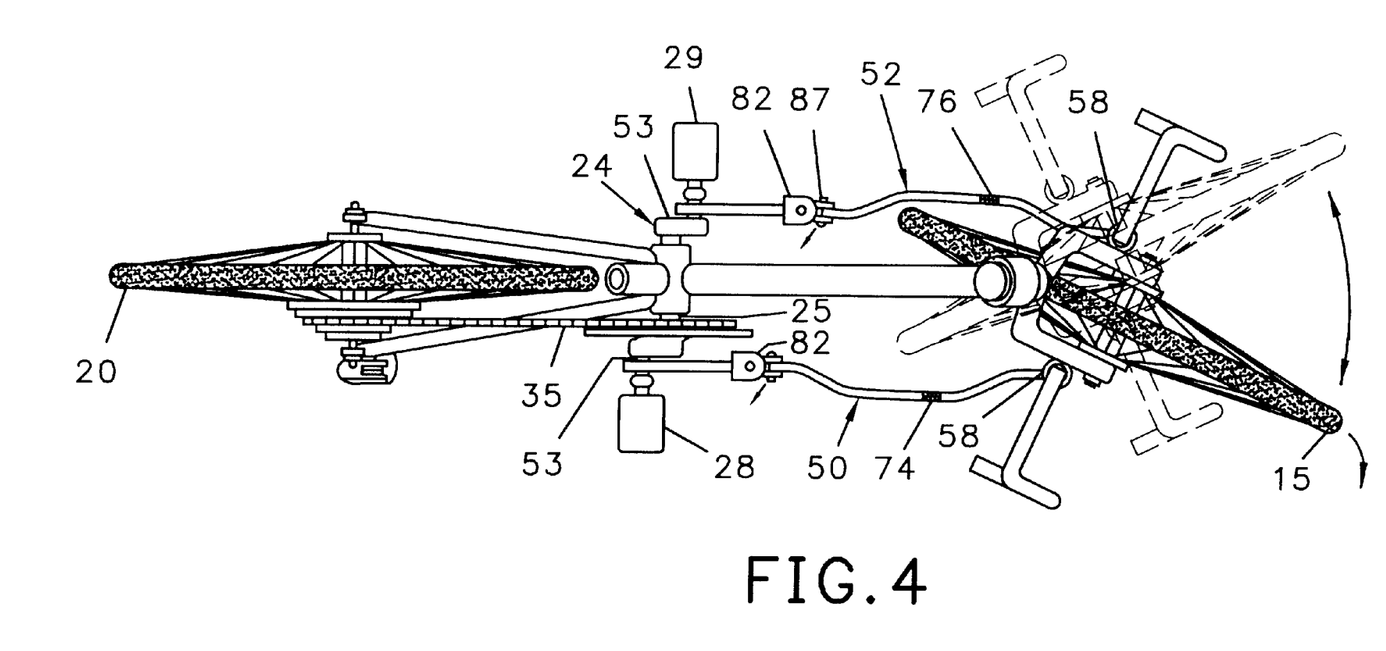
FIG. 4 is a top view, partially in cross-section, of the embodiment shown in FIG. 1 showing the approximate range of motion permitted by the steering levers.
Figure 5:
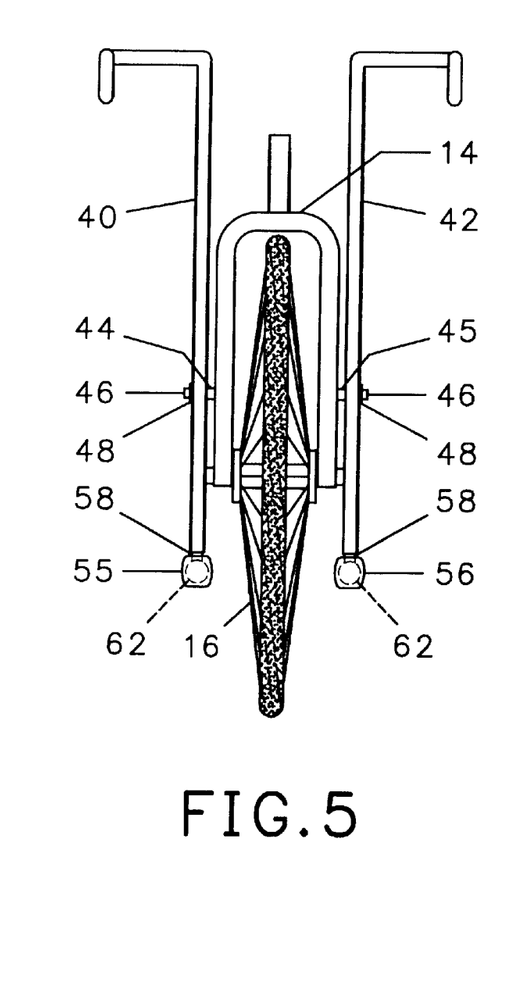
FIG. 5 is a front view of a preferred embodiment of the present invention without the frame.

FIG. 4 depicts approximately the maximum range of steering motion of bicycle 10 as the rider steers the bicycle to the right by turning levers 40 and 42 to the right. During this turning operation, as the rider turns levers 40 and 42 to the right in a clockwise direction, fork assembly 14 is turned in a clockwise direction. The turning of the levers 40 and 50 to turn the fork 14 substantially increases the torque of the tension springs 74 and 76, right tension spring 74 moderately compress to compensate for the length of right connecting rod 50, that is the distance between end 58 of right lever 40 and connecting arm 53 of drive crank assembly 24 which has been reduced a moderate distance. As a further consequence, left tension spring 76 will moderately extend to compensate for the length of left connecting rod 52, that is the distance between end 58 of left lever 42 and connecting arm 53 of drive crank assembly 24 which has been increased by the same relative distance. Tension springs 74 and 76 are of sufficient strength as far as to not substantially compress during the normal forward push stroke of levers 40 and 50. Two-way joints 82 will pivot within connecting rods 50 and 52 in a predetermined and limited clockwise direction along with fork assembly 14 to further permit the bicycle to be more easily maneuvered. FIG. 4 also depicts with phantom lines, approximately the maximum range of steering motion of bicycle 10 as the rider steers the bicycle to the left.

FIG. 6 shows a front view of bicycle 10 with the connecting rods 50 and 52 disconnected from the fight and left levers 40 and 42 and the crank assembly 24. The levers are joined and are no longer oscillatory due to a strip of ridged material 41 pivotally mounted on lever 40 and clasping to lever 41.

Figure 7:
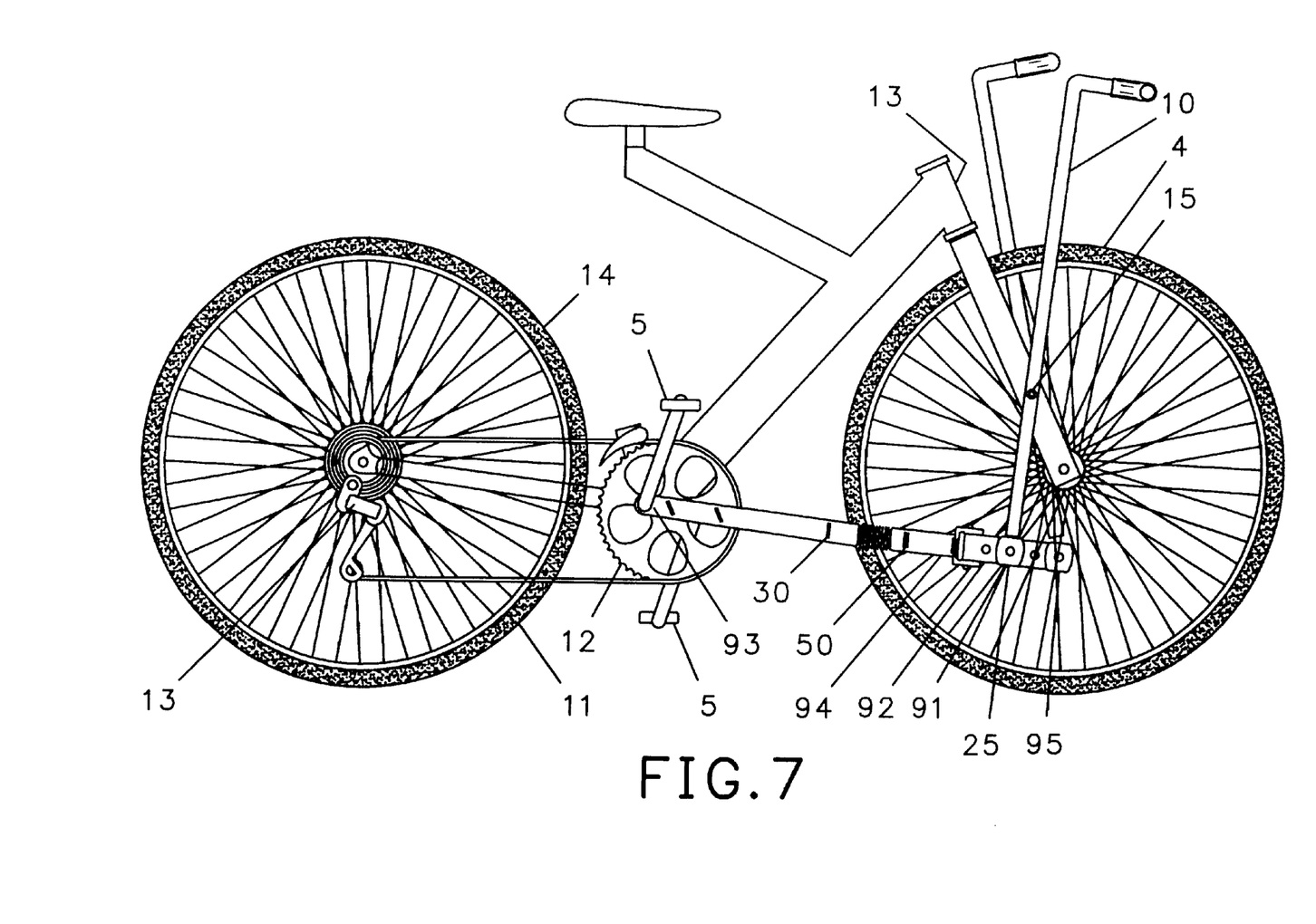
FIG. 7 is a right side view of a preferred embodiment utilizing a modern frame design showing a roller bearing and two-way joint as the steering means, together with tension springs.

FIG. 7 illustrates another preferred embodiment of steerable means. Right and left levers 40 and 42 joined the connecting rod by a roller bearing 91 and 95. Two-way joints mounted 92 and 94 directly rearward to the roller bearing.

Figure 8:
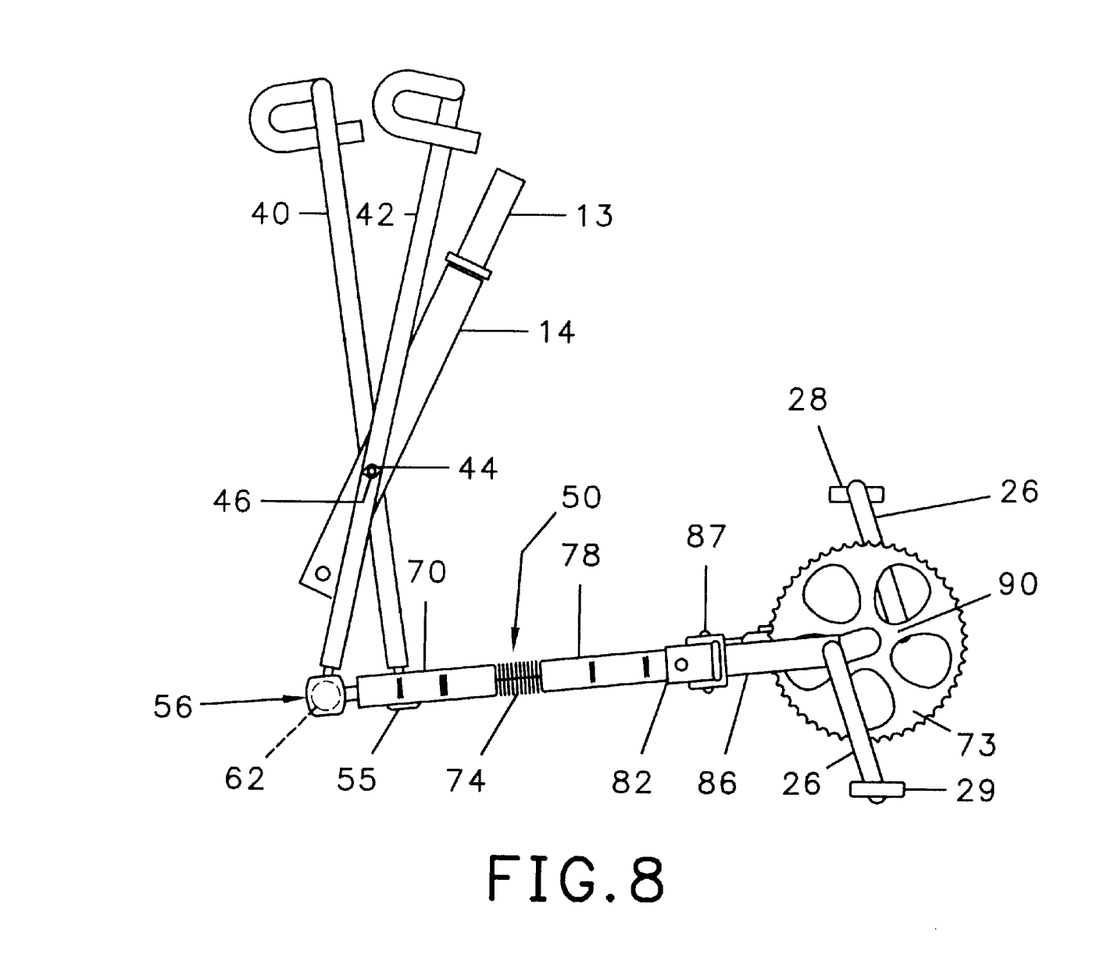
FIG. 8 is a left side view showing the conversion components to convert a conventional bicycle to a bicycle of the preferred embodiment of the present invention.

FIG. 8 illustrates the inter-connecting relationship of the components of a conversion kit of the present invention to convert a conventional bicycle into the bicycle of the preferred embodiment of the present invention. These components include a pair of oscillating steering levers 40 and 42, fork assembly 14 which also shows the pivotably mounted ridgid means 41 used to tie the oscillating levers to the fork above the front tire, the upper end of which is shown journaled in the usual manner to a fork tube of a conventional bicycle, a couple of cotter pins 46 or other fasteners to attach levers 40 and 42 to fork assembly 14, a pair of drive connecting rods 50 and 52, a pair of tie rods 55 and 56 or other steerable means connecting levers 40 and 42 to connecting rods 50 and 52, and drive crank assembly 24. Connecting rods 50 and 52 include two joints 82 and tension springs 74 and 76 as previously described.

Figure 9:
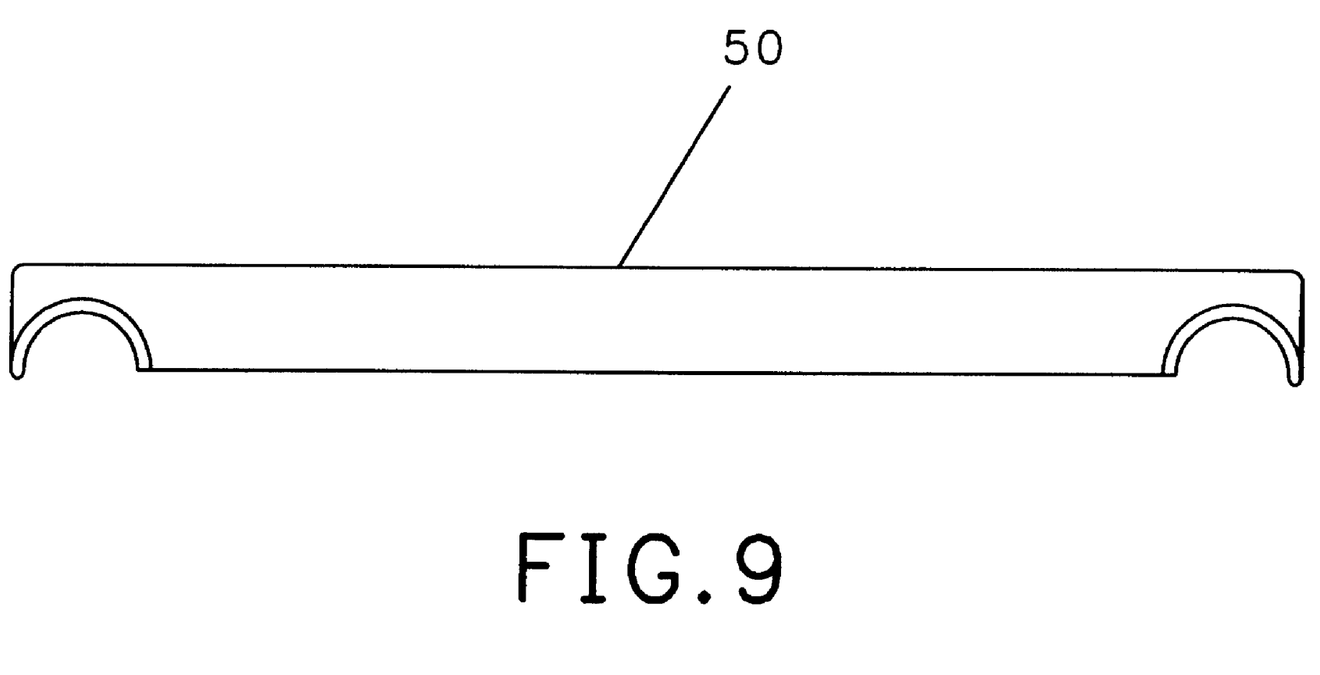
FIG. 9 illustrates how the shape of the connecting rod might be designed for easy removal when converting the cycle to a lower body powered cycle. The forward and rearward ends of the connecting rods 50 and 52 would slip over and/or off the rod contained in the lower ends of the oscillating levers 91 and the crank 53 for easy application or removal of the connecting rod.

FIG. 9 illustrates how the shape of the connecting rod might be designed for easy removal when converting the cycle to a lower body powered cycle. The forward and rearward ends of the connecting rods 50 and 52 would slip over and/or off the rod contained in the lower ends of the oscillating levers 91 and the crank 53 for easy application or removal of the connecting rod.

As used throughout the description of the invention and the claims, the terms "right" and "left" have been used for purposes of clarifying the orientation of certain critical components with reference to FIGS. 1–8. It is apparent to one skilled in the art that the drive and driven sprockets and the front and rear derailleur can be located on either the right or left side of the cycle without departing from the function of the cycle of the present invention. Further, without departing from the spirit and scope of this invention, one of ordinary skill in the art can make many other changes and modifications to the present invention or in the combination of components in the conversion kit with a conventional bicycle to adapt it to specific usages and conditions. As such, these changes and modifications are properly, equitably, and intended to be, within the full range of equivalents of the following claims.

I claim:

1. An upright in-line cycle comprising a pair of oscillatory levers pivotally mounted on a fork with the lower ends of the oscillatory levers joined to forward ends of connecting rods such that forward rod connections allow movement through a flexible connection permitting a front wheel to be steerable whereby the connecting rods rearward ends are joined to an offset crank whereby alternating pushing or pulling of the oscillating levers causes the connecting rods to move the crank approximately 180° with each stroke thereby converting upper body exertion into rotational energy and wherein the forward ends and rearward ends of the connecting rods disconnect such that the connecting rods may be removed altogether wherein a rigid strip is pivotally mounted on one of the oscillatory levers above the front wheel which connects to both the opposite oscillatory lever and the fork whereby the levers no longer oscillate but are stationary allowing the rider to operate the cycle with the lower body only.

2. The cycle of claim 1 wherein the forward rod connection is a tie rod.

3. The cycle of claim 1 wherein the forward rod connection is a two way joint.

4. The cycle of claim 1 wherein a steering mechanism is assisted by a spring in-between the forward and rearward ends of the connecting rod.

5. The cycle of claim 1 wherein a disconnecting means on the forward and rearward ends of each connecting rod is a quick release.

6. The cycle of claim 1 wherein the disconnecting means on the forward and rearward ends of each connecting rod is an open ended shape.

\* \* \* \* \*